March 22, 1932.    R. D. BALL ET AL    1,850,578
CONSTRUCTION OF DYNAMO ELECTRIC MACHINES
Filed Nov. 30, 1928    2 Sheets-Sheet 1

INVENTORS
R. D. Ball
H. C. Brown

Patented Mar. 22, 1932

1,850,578

UNITED STATES PATENT OFFICE

REGINALD DONAHOE BALL AND HENRY AUSTIN BROWN, OF STAFFORD, ENGLAND, ASSIGNORS TO THE ENGLISH ELECTRIC COMPANY LIMITED, OF LONDON, ENGLAND, A BRITISH COMPANY

CONSTRUCTION OF DYNAMO ELECTRIC MACHINES

Application filed November 30, 1928, Serial No. 322,930, and in Great Britain November 29, 1927.

In connection with the ventilation of dynamo electric machines by the passage of air through ducts arranged in planes at right angles to the shaft in the core of the rotor or stator or both of these, it has been recognized that an advantageous effect can be produced by giving to the wedges which close the mouth of the slots an appropriate shape in those parts of them which extend across the ventilating ducts. This advantageous shaping of parts of the wedges has hitherto only been carried out in the cases where the slots are of the type known as open slots, that is to say, slots which have substantially the same width at the point where they connect with the gap as in their rear portions. The present invention provides a construction which applies this advantageous form to wedges for use in the case of closed or partially closed slots, that is to say, slots where the openings connecting with the gap are materially narrower than the rear parts of the slots.

In accordance with the invention we provide wedges for use in closed or semi-closed slots, the said wedges having at the parts where they cross the ventilating ducts a section bounded in part by two sides, one of which is substantially radial and in line with one side of the coil in the slot, and the other of which adjoins the first side at its edge which is nearer to the gap and slopes rearward therefrom. This form of wedge may be provided in the rotor or stator alone or in both of them. In the latter case, the two sets of wedges are inversely disposed in the two elements of the machine. In the stator the radial side is placed so as to face the direction of movement of the air thrown outwards by the rotor and deflect it into a radial direction. When these wedges are provided in the rotor as well as the stator, the sloping face of the wedges increases the radial air velocity, thereby increasing further the volume of air passed through the radial ducts.

In order to provide the improved form of wedge at the part where it crosses the ventilating duct, it is necessary to give the wedge as a whole a sufficient radial depth at one side to provide the radial face above mentioned. This can be done by providing a suitable shape for the slot mouth so that the wedge as a whole naturally has a triangular section approximate to that required at the ducts or the usual form of slot mouth may be employed in conjunction with a wedge of abnormal depth radially so as to provide the required triangular section at the ducts when the front part of the wedge has been cut away.

The invention will now be described by way of example with reference to the accompanying drawings.

Figure 1:
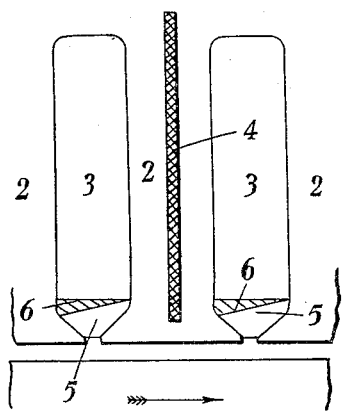
Figs. 1 and 2 show a part-section taken on the line A—B of Figure 4 through the centre of an air-duct in the stator core, the stator only being provided with wedges according to the invention.
Figure 2:
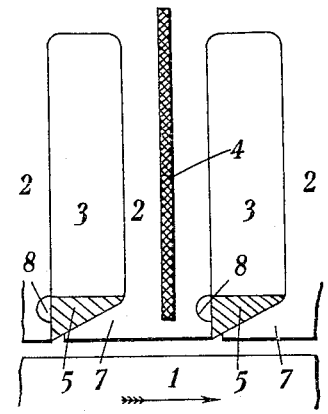

Referring particularly to Figs. 1 and 2, the rotor 1 rotates in the direction shown by the arrow. The core 2 has conductor slots 3 closed by the wedges 5 which retain the conductors in position. Spacers 4 determine the width of the ventilating duct.

In the case of Fig. 1 the slots are of the conventional semi-closed type. In order to obtain the necessary depth of radial surface the wedges 5 are made deep enough to fill a portion of the slots 3 where the sides are parallel. Where the wedges pass across the ducts, the front portions are cut away so as to leave a triangular section 6 as shown.

In the case of Fig. 2, the slots 3 are formed with one radial side and with the opposite side having an abnormally large tooth 7 to effect the partial closing of the slot mouth. The wedges 5 are thus triangular in section along their whole length having small projecting ribs engaging in recesses 8 cut in the radial sides of the slots 3 to assist in retaining the wedges in place. Where the wedges cross the ducts these projections are cut off so as to leave smooth radial faces for the full depth of the wedge at these points.

Figure 3:
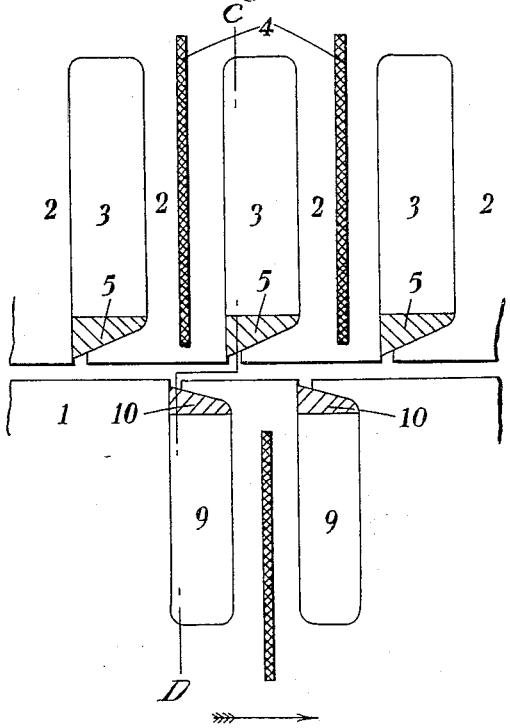
Fig. 3 shows a similar part-section, in which both stator and rotor are provided with wedges according to the invention
Figure 4:
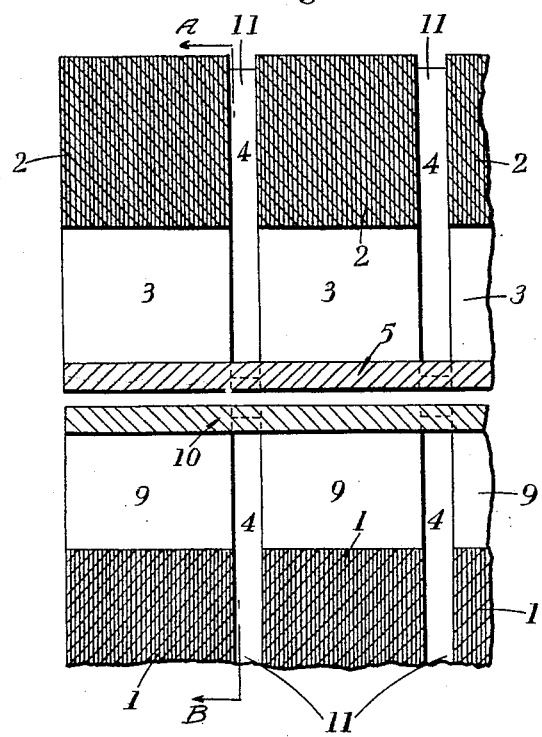
Figure 4 shows a longitudinal part section on the line C—D of Figure 3.

Referring to Figs. 3 and 4, the rotor 1 also has conductor slots 9 closed by the wedges 10 in the same manner as in the stator 2. It will be seen in Fig. 3 that the two sets of wedges are inversely disposed, in order to secure increased circulation of air through the ventilating ducts, which are shown in Fig. 4 at 11.

What we claim as our invention and desire to secure by Letters Patent is:—

1. A dynamo electric machine combination which includes a magnetic core, axial semi-closed conductor slots in said core, radial ventilating passages passing through said core and intersecting the conductor slots, conductors in said slots, and wedges fixing said conductors in said slots and passing through said ventilating passages, said wedges having throughout their length a substantially triangular cross-section, whereby the flow of air through the ventilating passages is assisted.

2. A dynamo-electric machine combination which includes a magnetic core, axial conductor slots in said core, radial ventilating passages passing through said core and intersecting the conductor slots, conductors in said slots, and wedges fixing said conductors in said slots and passing through said ventilating passages, said wedges having one surface sloping away from the periphery of the core and said core having the teeth between the said slots each with an edge shaped to fit against and support said sloping surface of a wedge.

3. A dynamo electric machine combination having stator and rotor magnetic cores, axial semi-closed conductor slots in said cores, radial ventilating passages passing through said cores and intersecting the conductor slots, conductors in said slots, and wedges of substantially triangular cross-section fixing said conductors in said slots and passing through said ventilating passages, the wedges being inversely arranged on the rotor and stator respectively.

4. A dynamo electric machine combination which includes magnetic stator and rotor cores, axial conductor slots in said cores, radial ventilating passages passing through said cores and intersecting the conductor slots, conductors in said slots, and wedges fixing said conductors in said slots and passing through said ventilating passages, the stator wedges each having one surface sloping away from the air-gap in one direction, and the rotor wedges each having one surface sloping away from the air-gap in the opposite direction, both stator and rotor cores having teeth shaped to fit against and support the sloping surfaces of the wedges.

In testimony whereof we affix our signatures.

REGINALD DONAHOE BALL.
HENRY AUSTIN BROWN.